United States Patent [19]

Kito et al.

[11] Patent Number: 4,718,480
[45] Date of Patent: Jan. 12, 1988

[54] APPARATUS AND METHOD FOR SCRAPING THE INTERIOR OF A FLUID HANDLING DEVICE

[75] Inventors: Masahiro Kito, Nagoya, Japan; Katsuhiro Mori, Hove, England

[73] Assignee: Aisin Seiki Kabushiki Kaisha, Kariya, Japan

[21] Appl. No.: 852,827

[22] Filed: Apr. 16, 1986

[30] Foreign Application Priority Data

Apr. 27, 1985 [GB] United Kingdom ............... 8510750

[51] Int. Cl.⁴ .............................................. F28F 17/00
[52] U.S. Cl. ....................................... 165/94; 165/32; 15/3.52
[58] Field of Search ................ 60/527; 165/32, 94, 165/1; 15/3.51, 3.52

[56] References Cited

U.S. PATENT DOCUMENTS

| | | | |
|---|---|---|---|
| 1,266,140 | 5/1918 | Montgomery | 15/3.52 |
| 2,915,294 | 12/1959 | Christensen | 165/174 |
| 3,086,372 | 4/1963 | Barger et al. | 165/174 |
| 3,384,161 | 5/1968 | Malmstrom et al. | 165/94 |
| 3,957,107 | 5/1976 | Altoz et al. | 165/32 |
| 4,315,541 | 2/1982 | Murata et al. | 165/94 |
| 4,463,560 | 8/1984 | Greenleaf et al. | 60/527 |
| 4,490,975 | 1/1985 | Yaeger et al. | 60/527 |

FOREIGN PATENT DOCUMENTS 231397 12/1984 Japan ............................. 165/32 HV

*Primary Examiner*—Albert W. Davis, Jr.
*Assistant Examiner*—Peggy Neils
*Attorney, Agent, or Firm*—Oblon, Fisher, Spivak, McClelland, & Maier

[57] ABSTRACT

Apparatus and method for scraping the interior of a fluid handling device such as the tubes of a heat exchanger, wherein a scraper in the form of a ribbon, a turbulence promoter, a cylindrical wire mesh or the like is disposed in each tube and scrapingly moved back and forth within the tubes by a spring made of a temperature-responsive shape memory alloy. A fluid handling device provided with the scraping means does not need to be disassembled or even taken off-line. The scraper acts while the fluid handling device is in use, because the temperature-reactive spring can respond to the temperature of fluid flowing through the device or to thermal energy applied at will, as by electric resistance heat.

1 Claim, 12 Drawing Figures

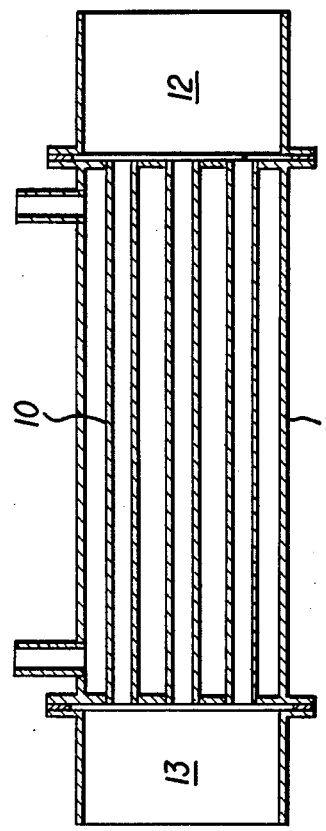

APPARATUS AND METHOD FOR SCRAPING THE INTERIOR OF A FLUID HANDLING DEVICE

BACKGROUND OF THE INVENTION

1. Field of the Invention

The present invention relates to a scraping apparatus and method for scraping the interior of a fluid handling device, for example, for cleaning the interiors of the tubes of a heat exchanger.

2. Description of the Background

FIG. 1 shows a conventional shell and tube heat exchanger, which is one example of a fluid handling device in which the current invention is useful. It comprises a plurality of tubes 10, a shell 11, and inlet and outlet manifolds 12, 13. No special means are provided in the conventional heat exchanger for scraping the interior thereof. For example, it typically is necessary to separate the manifolds 12, 13 from the shell 11 in order to scrape the interiors of the tubes 10. During such scraping, the heat exchanger may not be used. Consequently, the system in which the heat exchanger is used experiences down time. Furthermore, when the tubes 10 are lengthy, it frequently is extremely difficult to scrape the central portions of the tubes.

Of course, in the absence of such scraping the efficiency of the heat transfer will diminish over time due to the build-up of foreign matter. Such problems are not limited to heat exchangers. For example, a process pipe in a factory, an exhaust pipe and the like all are subject to the build-up of foreign matter on the insides thereof, causing increased frictional resistance to the flow of fluid therein.

SUMMARY OF THE INVENTION

It is an object of the current invention to provide an apparatus and method for scraping the interior of a fluid handling device so as to obviate the aforementioned difficulties.

It is a further object of the present invention to provide an apparatus and method for scraping the entire length of the pipes of a heat exchanger while the heat exchanger is in use, thereby eliminating the necessity of disassembling the heat exchanger for scraping.

A still further object of the invention is to provide an apparatus and method for scraping the interior of a fluid handling device, the apparatus being relatively small and compact in size.

To achieve the above-named objectives and additional advantages, the current invention provides a scraping means for scraping an interior surface of a tube, the scraping means being movably disposed in the tube and in scraping contact with an interior surface of the tube, and a spring means comprising at least a first spring, the first spring being made of a temperature-responsive shape memory alloy and being used for urging the scraping means in a longitudinal direction within the tube.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross-section of a conventional heat exchanger;

FIG. 3 shows a ribbon, which may be used as the scraping means in several embodiments according to the current invention;

FIG. 4 is an end view of the ribbon of FIG. 3;

FIG. 5 shows a turbulence promoter, which may be used as the scraping means in several embodiments according to the current invention;

FIG. 6 is an end view of the turbulence promoter of FIG. 5;

FIG. 7 shows a cylindrical mesh tube, which may be used as the scraping means in several embodiments according to the current invention;

FIG. 8 is an end view of the mesh tube of FIG. 7;

DETAILED DESCRIPTION OF THE PREFERRED EMBODIMENTS

Figure 2:
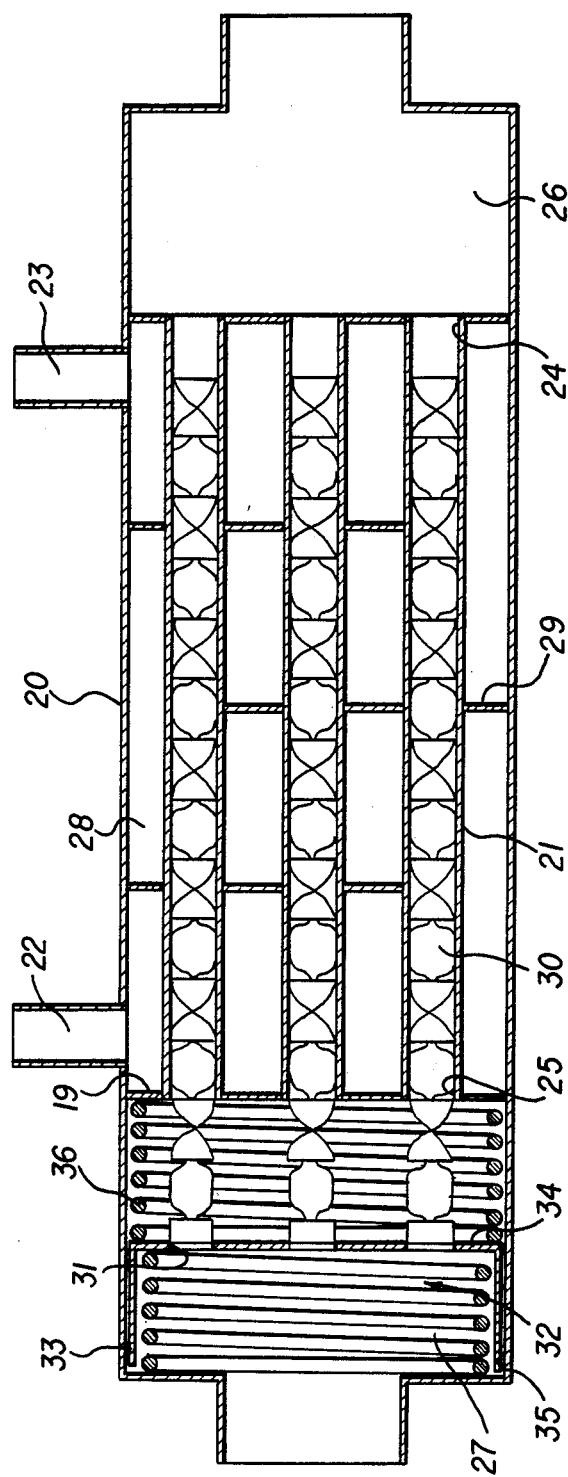
FIG. 2 is a cross-section of a heat exchanger provided with a scraping apparatus according to a first embodiment of the current invention, the apparatus being shown in its unactuated state.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 2 shows a scraping apparatus according to a first embodiment of the current invention as applied in a shell and tube type heat exchanger. Casing 20 having a hollow, cylindrical shape contains a plurality of tubes 21 fixed therein. The casing 20 is provided with inlet and outlet ports 22, 23 for a first fluid which may, for example, be water. Each tube 21 is open at its opposite ends 24, 25 for passing a second fluid which may, for example, be exhaust gas of a high temperature. The exhaust gas may pass, for example, through inlet manifold 26, through tubes 21 to an outlet manifold 27.

Water passing through the inlet port 22 of the casing 20 enters a space 28 between the inner circumference of the casing 20 and the outer circumferential surfaces of the tubes 21, so that the water may be warmed by the high temperature exhaust gas passing through the interiors of the tubes 21. Baffles 29 fixed in the casing 20 effectively regulate the flow of the water.

Disposed within each tube 21, and axially movable therein, is a scraping means. In FIGS. 2, 9, 10 and 12, the scraping means is illustrated as turbulence promoters 30. A turbulence promoter 30 is shown in more detail in FIGS. 5 and 6.

The diameter of turbulence promoter 30 is substantially the same as that of the inner diameters of the tubes 21. As shown in FIG. 2, the left end of each turbulence promoter 30 is fixed on a movable element 32. In the illustrated embodiment, the movable element 32 comprises a base portion 34 and a cylindrical portion 33.

Movable element 32 is longitudinally movable within manifold 27. A plurality of holes 31 are provided in base portion 34 of movable element 32 at the locations where the turbulence promoters 30 are attached thereto. Accordingly, longitudinal movement of the movable element 32 results in movement of the turbulence promoters 30 within the tubes 21, thereby scraping the interiors of the tubes 21.

FIG. 2 illustrates the unactuated state of the scraping apparatus. In this state, the right ends of the turbulence promoters 30 are disposed at a distance from the open inlets 24 of the tubes 21.

The scraping apparatus is provided with spring means. In the embodiment illustrated in FIG. 2, the spring means comprises a first spring 35 and a second spring 36. The first spring 35 and the second spring 36 are disposed in the outlet manifold 27 of the casing 20.

One end of the first spring means 35 engages a left side wall of casing 20, which also is a left side wall of outlet manifold 27. The opposite end of first spring 35 engages the base portion 34 of movable element 32. As described in more detail below, the first spring 35 comprises means for urging the turbulence promoters 30 toward the right in FIG. 2.

First spring 35 is made of a temperature-responsive shape memory alloy. A characteristic of such known alloys is that elements made of such alloys, when heated, return to a "37 remembered" shape. Accordingly, when first spring 35 is heated, it expands to urge movable element 32 toward the right in FIG. 2, thereby urging the turbulence promoters 30 in a longitudinal direction within the tubes 21.

Second spring 36 is operatively engaged in outlet manifold 27 between a right wall 19 of outlet manifold 27 and the base portion 34 of movable element 32. Second spring 36 opposes the motion of movable element 32 which is caused by first spring 35. Accordingly, second spring 36 comprises means for urging movable element 32 toward the left in FIG. 2. Thus it may be seen that the scraping apparatus according to the current invention comprises spring means for urging scraping means in first and second longitudinal directions within the tubes 21.

FIGS. 3-8 show three kinds of scrapers according to the current invention. In particular, FIGS. 3 and 4 show a ribbon 37. FIGS. 5 and 6 show the turbulence promoter 30, discussed above. FIGS. 7 and 8 show a cylindrical mesh tube 38. It is preferable that the diameters of each of the above scrapers 30, 37, 38 be substantially the same as the interior diameters of the tubes 21 or other fluid handling means being scraped.

The operation according to the first embodiment of the present invention will now be described with reference to FIGS. 2 and 9.

In the unactuated state shown in FIG. 2, the resultant force on movable element 32 generated by the spring means, which includes first spring 35 and second spring 36, positions the movable element 32 as shown. In order to achieve the actuated state shown in FIG. 9, the temperature of first spring 35 is raised. This may be accomplished in several ways, to be discussed in more detail below. When the temperature of first spring 35 is increased to or beyond its "memorized" temperature, first spring 35 expands toward its memorized shape. In so doing, the first spring 35 urges the movable element 32 toward the right in FIG. 2, against the opposing force of second spring 36. As a result, the turbulence promoters 30 are moved toward the right within the tubes 21, thereby scraping the interiors of the tubes 21 to remove foul matter or the like which may have built up on the inner surfaces. Because the heat exchanger may be in operation during such movement, the removed foreign matter is carried away, as toward the left in FIG. 2, through the holes 31 and into the outlet manifold 27.

Figure 9:
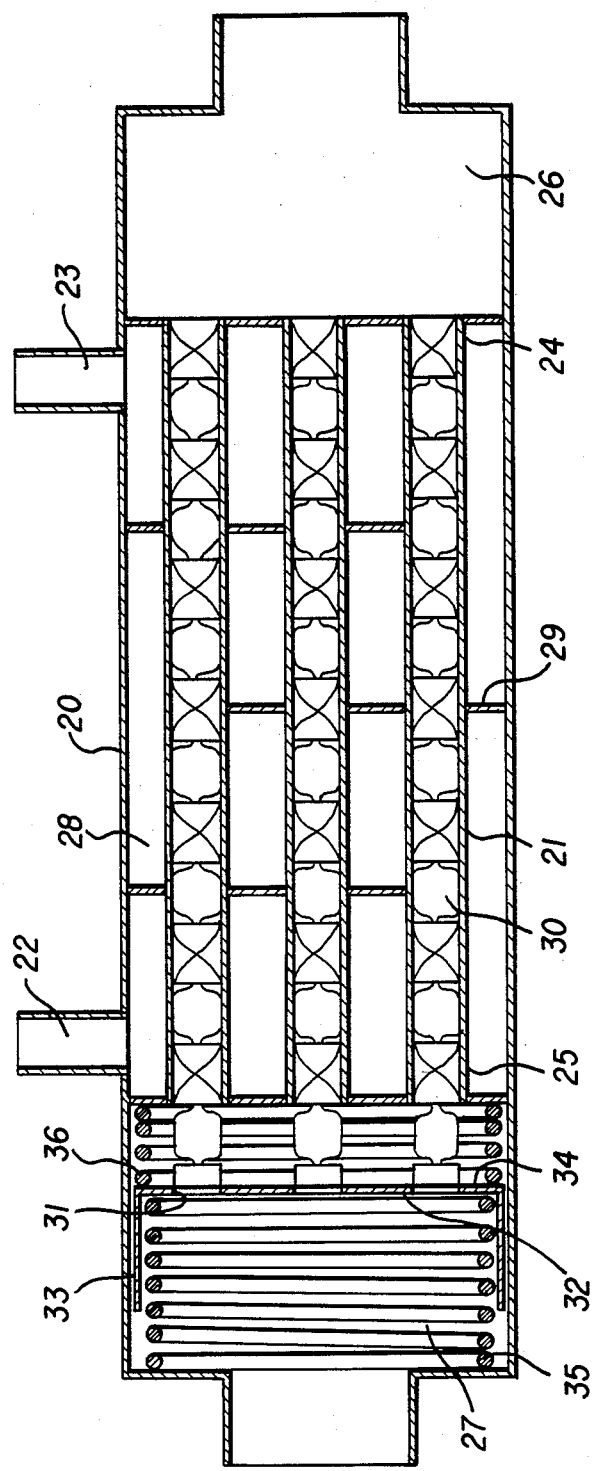
FIG. 9 is a view like FIG. 2, the apparatus being shown in its actuated state.

Thus, the scraping apparatus achieves the actuated state shown in FIG. 9. In this state, the right ends of the turbulence promoters 30 are desirably at least flush with the open inlet ends 24 of the tubes 21.

Thereafter, when the temperature of first spring 35 decreases, it returns toward the state shown in FIG. 2, and the movable element 32 is urged toward the left through operation of the second spring 36. At this time, the turbulence promoters 30 move toward the left, again scraping foreign matter or the like off of the interior walls of the tubes 21. The above-mentioned operation is repeated according to successive increases and decreases in the temperature of first spring 35, according to which the scraping is automatically performed without the necessity of disassembling portions of the heat exchanger or of interrupting the operation of the heat exchanger.

Because of the location of spring means 35, it is exposed to the temperature of the fluid in outlet manifold 27. Accordingly, the scraping operation may be performed as governed by variations in the temperature of this fluid. These variations may occur either naturally, as the result of a characteristic of the system in which the heat exchanger is located, or they may be imposed by the deliberate introduction of fluid of a known temperature with respect to the "memory temperature" of the spring 35.

In the alternative, as in case the temperature within the outlet manifold 27 is usually substantially constant, the temperature of first spring means 35 may be increased by the use of electric resistance heat. Such electric resistance heat may be provided by any of a number of means which will be apparent to one of ordinary skill in the art and may, if desired, be controlled by a timer.

Figure 10:
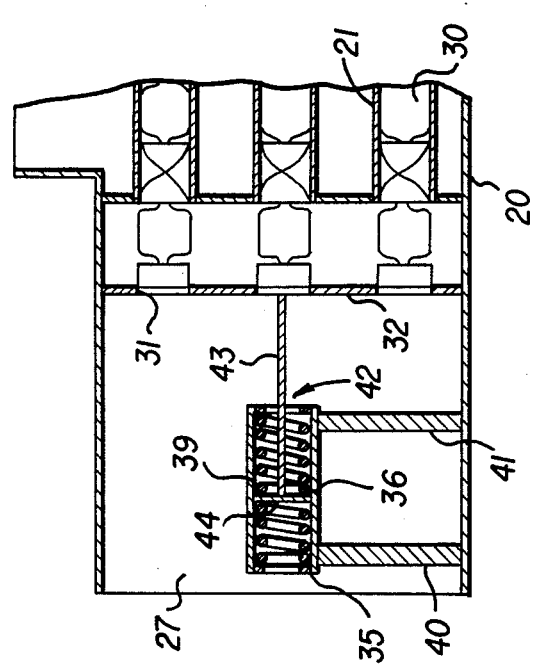
FIG. 10 is a view, partly in section, illustrating a second embodiment according to the current invention.

FIG. 10 shows a portion of a scraping apparatus according to a second embodiment of the current invention. According to this embodiment, movable element 32 may be a simple plate having holes 31 therein. Accordingly, a cylindrical element 33 as in the first embodiment is not a necessary element of the movable element 32.

Also shown in FIG. 10 is a housing 39, open at the opposite ends thereof and attached to the inner circumferential face of manifold 27 by housing support members 40, 41. Actuator 42 is axially movable within the housing 39. It comprises an actuator rod 43 and an actuator projection 44. As shown in FIG. 10, the right end portion of the rod 43 is fixed either on a turbulence promoter 30 or on the movable plate 32. Accordingly, the turbulence promoters 30 are driven by motion imparted to the actuator projection 44. Actuator projection 44 is driven by spring means, including first spring 35 and second spring 36. The first spring 35 is interposed between the actuator projection 44 and a left end wall of housing 39. Second spring 36 is operatively disposed between the turbulence promoters 30 and the actuator projection 44, and is held in place between the projection 44 and a right end wall of the housing 39. As was the case of the first embodiment, the first spring 35 is made of a temperature-responsive shape memory alloy. Accordingly, the function of the spring means of this embodiment is quite similar to that of the first embodiment described above. In particular, the spring means act on opposite sides of projection 44 in a fashion analogous to the operation of the spring means on opposite sides of the movable element 32 in the first embodiment.

Figure 11:
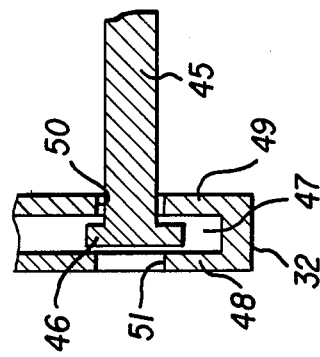
FIG. 11 is a view showing an alternative embodiment of the connection between scraping means and a movable element.

FIG. 11 shows an alternative connection between movable plate 32 and scraping means 45. In the connection illustrated in FIG. 11, movable element 32 comprises first and second walls 48, 49 with a gap 47 being disposed therebetween. The scraping means 45 comprises a projection 46 which is loosely inserted through a hole 50 in wall 49 and into the gap 47 between the two walls 48, 49. Hole 51 is a fluid passage. A characteristic of the connection illustrated in FIG. 8 is that the scraping means 45 can easily be assembled in place in the tubes 21 and can easily achieve smooth axial movement therein.

Figure 12:
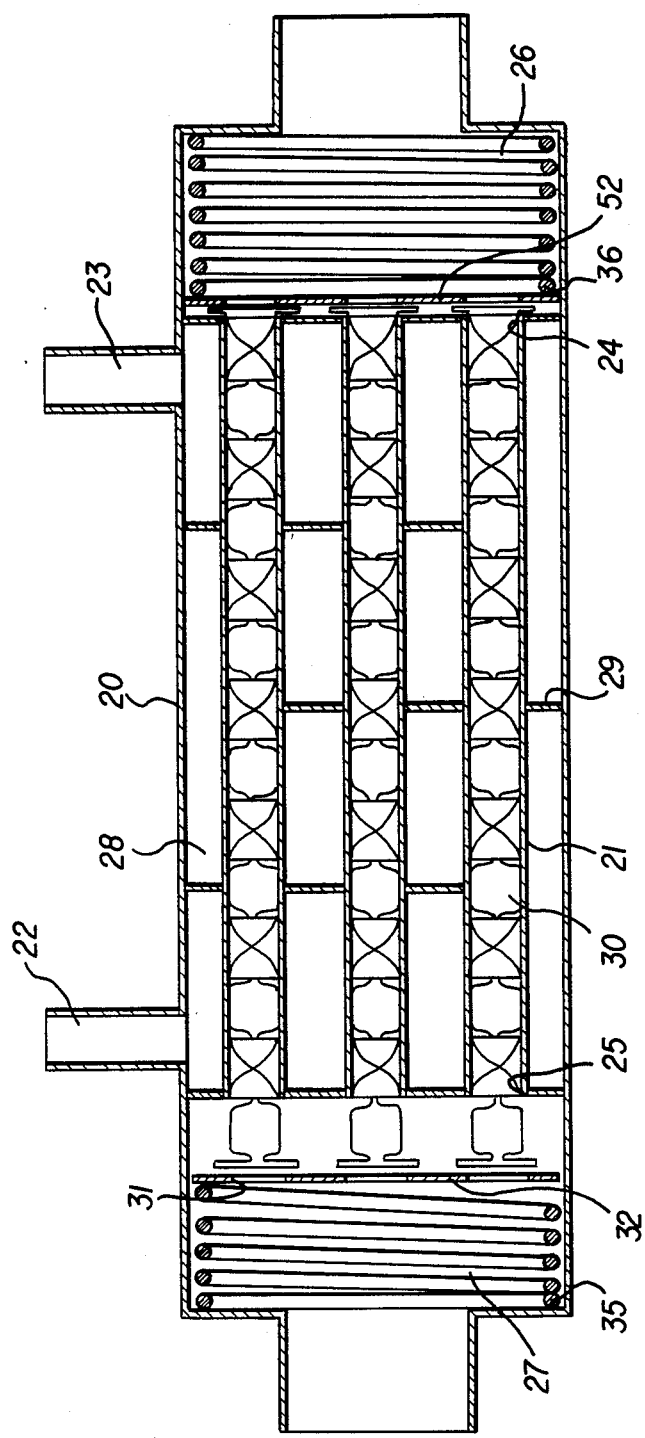
FIG. 12 is a view, partly in section, showing a scraping apparatus according to a third embodiment of the current invention.

FIG. 12 shows a scraping apparatus according to a third embodiment of the current invention. As above, the first spring 35 is disposed within the outlet manifold 27, but the second spring 36 is disposed in the inlet manifold 26. Movable element 32 takes the form of a plate having a plurality of holes 51, and there is provided a second movable element 52 in the form of a plate. Movable element 32 is interposed between the first spring 35 and the left ends of the turbulence promoters 30, and the second movable element 52 is interposed between the second spring 36 and the right ends of the turbulence promoters 30. Accordingly, the turbulence promoters 30 are axially movable in first and second directions within the tubes 21 in accordance with the urging forces developed in the first and second springs 35, 36 and transmitted thereto via the movable elements 32, 52. In this embodiment, the turbulence promoters are not fixed on the movable plates 32, 52. Accordingly, smooth axial movement of the turbulence promoters 30 can be achieved.

Further embodiments also are possible. For example, the first spring 35 may be a standard spring, and the second spring 36 may be made of the temperature-responsive shape memory alloy. In such a case, FIG. 2 would illustrate the actuated state of the scraping apparatus, and FIG. 9 would illustrate the non-actuated state.

In the first and second embodiments, the first and second spring means 35, 36 may be disposed within the inlet manifold 26 rather than within the outlet manifold 27, if desired.

If the heat exchanger or other fluid handling apparatus being scraped is oriented vertically, the second spring means 36 may not be necessary, its function being performed by gravity operating on the movable element 32 and the scraping means. Similarly, under certain operational circumstances, the function of the spring 36 may be replaced by the force of fluid acting dynamically on, for example, turbulence promoter 30.

Although the word "tubes" is used in reference to elements 21, it will be readily understood that any of a variety of fluid handling means may be scraped using a scraper according to the current invention. For example, a tube 21 might not be linear along its length and might have a cross-section other than circular.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the Unites States is:

1. A method of scraping an interior surface of a fluid handling device having a longitudinal axis, a scraping means disposed therein in scraping contact with the interior surface, a fluid outlet manifold, and spring means disposed in the outlet manifold, the spring means being made of a temperature-responsive shape memory alloy and exhibiting a first shape at temperatures below a predetermined temperature and a second shape at temperatures above the predetermined temperature, the spring means operatively engaging the scraping means such that a change of shape of the spring means will cause longitudinal movement of the scraping means, said method comprising the steps of:

- exposing the spring means to the temperature of a fluid in the outlet manifold;
- raising the temperature of the spring means an amount sufficient to cause a change of shape of the spring means from the first shape to the second shape;
- using said change of shape of the spring means to move the scraping means in a first axial direction within the fluid handling device, thereby scraping the interior surface;
- lowering the temperature of the spring means an amount sufficient to cause the spring means to return to the first shape; and
- moving the scraping means in a second axial direction within the fluid handling device, thereby further scraping the interior surface.

* * * * *